United States Patent [19]
Hahn et al.

[11] Patent Number: 6,108,766
[45] Date of Patent: Aug. 22, 2000

[54] STRUCTURE OF PROCESSOR HAVING A PLURALITY OF MAIN PROCESSORS AND SUB PROCESSORS, AND A METHOD FOR SHARING THE SUB PROCESSORS

[75] Inventors: Woo Jong Hahn; Kyong Park; Suk Han Yoon, all of Daejon-Shi, Rep. of Korea

[73] Assignee: Electronics and Telecommunications Research Institute, Daejeon, Rep. of Korea

[21] Appl. No.: 09/131,891

[22] Filed: Aug. 10, 1998

[30] Foreign Application Priority Data

Dec. 8, 1997 [KR] Rep. of Korea ............... 97-38477

[51] Int. Cl.[7] ................................ G06F 15/16
[52] U.S. Cl. ........................... 712/34; 712/244
[58] Field of Search ....................... 712/34, 244

[56] References Cited

U.S. PATENT DOCUMENTS

| | | | |
|---|---|---|---|
| 4,751,631 | 6/1988 | Fisher | 377/49 |
| 5,347,639 | 9/1994 | Rechtschaffen | 712/203 |
| 5,353,419 | 10/1994 | Touch et al. | 712/235 |
| 5,359,715 | 10/1994 | Heil et al. | 710/128 |
| 5,706,465 | 1/1998 | Kurokawa | 711/123 |
| 5,717,882 | 2/1998 | Abramson | 712/217 |
| 5,805,852 | 9/1998 | Nakanishi | 712/218 |
| 5,918,248 | 6/1999 | Newell | 711/147 |

*Primary Examiner*—Eric Coleman
*Attorney, Agent, or Firm*—Antonelli, Terry, Stout & Kraus, LLP

[57] ABSTRACT

The present invention relates to a structure of processor having a plurality of main processors and sub processors, and a method for sharing the sub processors, wherein a method is used for preserving a state of a register file by using a shadow register file when main processor inputs an instruction of the sub processor in case that an exceptional situation happens under processing of an instruction of sub processor and for rolling back thereafter the preserved state in case there is an information of occurrence of the exceptional situation from the sub processor. Also, in order to solve a problem that cache efficiency is reduced due to the use of a first cache which is relatively small and frequently used, there is suggested a first cache bypassing function. Further, in order to solve a problem that its processing speed is reduced when the main processor transfers instructions in sub processor, it is possible to improve the processors' parallelism and its efficiency by providing an extra register file.

7 Claims, 4 Drawing Sheets

STRUCTURE OF PROCESSOR HAVING A PLURALITY OF MAIN PROCESSORS AND SUB PROCESSORS, AND A METHOD FOR SHARING THE SUB PROCESSORS

BACKGROUND OF THE INVENTION

1. Field of the Invention

The present invention relates to a structure of processor having a plurality of main processors and sub processors, and a method for sharing the sub processors.

2. Description of the Related Art

In a conventional processor structure, a system for supporting the sub processor is mainly divided into a system having an external processor and a system having an internal processing unit. A processing using the external processor has disadvantages that even if the design for the processor is simple, an instruction of sub processor should be executed in external chip elements resulting in a deterioration of processing characteristics and the main processor is not processed in parallel with sub processor, resulting in a deterioration of main processor's performance in processing a program. Also, the system being realized by an internal processing unit has excellent processing performance, but it share the sub processor's function when a plurality of main-processors exist, because the sub processor could operate as a part of main processor processing unit inside the main processor.

According to the advance of semiconductor technology, as the number of circuits or transistors which can be accommodated by a processor element, increases, it becomes possible to integrate a plurality of main processors into a processor and also integrate several complex functions into a processor. Processors which are used widely at present build-in a small cache memory and one or two sub processors as well as several main processor processing units.

When there are several such main processor processing units, it is possible to maximize their performance by executing the processing units, simultaneously. It can be shown as a grade of an instruction-level parallelism. In order to improve the grade of the instruction-level parallelism, methods have been suggested for removing a processing dependency between a plurality of processing units or solving the dependency in effect. In this case, sub processors such as a floating-point arithmetic unit, graphic processors, and so on have characteristics other than these of main processor with respect to a processing time, a data format, a processing instruction format, and so on. Therefore, the sub processors are treated differently with several main processor processing units and thus the instruction-level parallelism becomes an important factor on processing performance of various application programs including a sub processor instruction.

When integrating a plurality of main processors into a processor, it becomes a severe waste factor for all main processors to have a sub processor whose frequency in use is less than that of a main processor and in particular, it has a big problem when the sub processor has several functions including a graphic processing function, communication processing function, and so on, except for a general floating-point arithmetic function.

That is, in such case, there is a disadvantage that it is not possible to access effectively various functions of the sub processor when a plurality of main processors exist.

In order to overcome this problem, there have been much researches and developments. There is a method for connecting one or more sub processors to a main processor via an external bus interface. This method has an effect in reducing a special signaling burden for the sub processor. However, the processor cannot perform other works when processing an instruction of the sub processor and it is not possible to maximize an instruction-level parallelism because of a deterioration of its performance caused by transferring data necessary for sub processor as an instruction.

Also, there is a method for processing and restoring an exceptional situation that occurs when processing a sub processor instruction, using a minimum of information. According to this method, position information to be returned through restoring after servicing the exceptional case is limited only and transferred to a queue position in which a program counter is stored. However, this method also has a problem that when restoring, a value of register cannot be restored. Also, the information, which will be stored, can be stored and restored just as many as a pipeline grade. It can only cope with an exceptional situation, which occurs before processing of the present instruction is completed and it is not possible to be restored when the next instruction starts processing. Therefore, there is a problem that the sub processor should be synchronized to the pipeline of main processor or main processor should be stopped while processing of the sub processor.

There is a method for using a partial decoding in order to shorten an instruction fetching time. This method reduces an instruction fetching delay time in the instruction flow that has a branch and is capable of improving the performance of sub processor by fetching the instruction in advance, so as to meet the branch. However, there is no effect in an usual situation, except the possibility that instruction for the sub processor can be fetched in advance, and it does not include a direct data path for the sub processor.

In order to execute independently an external input/output operating or a memory access operating independently, there has been suggested a method for adopting a decoupling system for an external interface. This method is to access an external device under multi-processor circumstance, but it does not provide a method for improving the its efficiency when a plurality of processors share an sub processor on a individual instruction level. Also, because the conventional concept of decoupling between internal execution units does not include a structure of multi processors and a concept of shared sub processor interface, it does not suggest any measure to meet an exceptional situation in sub processor or a method for scheduling an instruction of sub processor. In addition, a queue, which is applied to the above method, is satisfied with the usual first in first out system (FIFO), but it does not provide a structure which is capable of checking and scheduling a plurality of entries at a time.

There has been presented a method for using a sub processor for floating-point arithmetic unit. This method uses a technique, which may improve instruction-level parallelism between a main processor and a sub processor. However, this method neither includes a concept of decoupling by the use of queue nor teaches a concept of sharing a plurality of main processors by using a queue of a sub processor. In storing a data in an internal register, the method also tries to maintain a consistency of data by checking an inter-dependency between instructions, which are executed or ready to be executed. However, it does not include a method for allocating a plurality of register files, one per main processor, to sub processor. Further, the above method does not teach a technique that a data for a sub processor may bypass a small internal cache. The method is only capable of reducing a pipeline stall and improving its performance by using a cache. There is a method for connecting a main processor and a sub processor via an external bus. According to the method, the main processor should be in a waiting state, when a sub processor instruction is executed and when it should transfer data necessary for a sub processor via a bus in the same process as in an instruction, resulting in deterioration of an executing performance. Moreover, this method does not include a concept of an instruction-level parallelism. Therefore, the above method does not include any special measure to handle an exceptional situation occurring in a sub processor and functions only to inform its situation through a bus which is connected to a main processor. As a method for suggesting a structure of multi processors, there is a method for embedding one or more main processors into one processor and connecting a plurality of processors. However, this method also does not teach a technique that is capable of sharing effectively the sub processor.

As a method for applying a concept of decoupling, there is a method for positioning an instruction queue between instruction fetching units and an executing unit of main processor and sub processor. However, this method has no sharing function because it does not support a plurality of main processors. Accordingly, there is no function capable of processing simultaneously several instructions that are required by a plurality of main processors. In processing an exceptional situation, this method uses a temporary register file. However, because the number of the temporary register file could not be infinite, even though sub processor processing units are decoupled, the scope of the execution time with in which the processor can handle and recover from an exceptional case should be greatly limited. Otherwise, it causes a problem that it is not possible to restore the processor status under of exceptional circumstances or that other functions of the processor should be stalled until there is a room in that temporary register file.

SUMMARY OF THE INVENTION

Accordingly, the object of the present invention is to provide a structure of processor having a plurality of main processors and sub processors and a method for sharing the sub processors, in which it is possible to improve instruction-level parallelism, restore an exceptional situation by a simple logic and store/fetch data without impeding efficiency of a cache according to a kind of a data in all of main processors and sub processor. To achieve the above object, the structure of processor according to the present invention comprises: a plurality of main processors for processing a program by receiving an instruction and data from an external memory, and having a shadow register for handling an exceptional situation; a plurality of sub processors for processing the above received instruction in parallel with the above main processors, having the first cache bypassing function when processing a large quantity of data and including a register file for the main processors; and an internal connecting network for connecting the main processors and sub processors.

To achieve the above object, also, the method for sharing sub processors according to the present invention comprises the steps of: fetching program instructions from an external memory through an instruction cache/memory management unit and instruction fetching/checking unit; checking whether the fetched instructions are for a main processor or a sub processor; transferring the instructions to a decoding unit in the main processor when the fetched instructions are for the main processor and converting them to a form of an internal information; transferring the instructions, which have been converted to the form of the internal information, to an instruction-issuing unit in the main processor; allocating a register and executing unit the instruction, which have been transferred to the instruction issuing unit and therefore transferring them to the executing units which includes a register file operating the instructions, which have been transferred to the executing unit; storing/fetching data, which is required after completing the above operating, fetching data by using an internal data cache or referring to an external memory, when fetching data from the external unit or storing the above instructions to the external unit transferring the fetched instructions to instruction queue when the fetched instructions are for the sub processor; instruction scheduling for selecting instructions, which are capable of processing simultaneously by checking the instruction queue in the instruction issuing unit; allocating the executing unit and register file the instructions selected by the above instruction issuing unit; processing an operation in the executing unit according to the information allocated in the above instruction issuing unit; processing a process of using a shunting register and a process of processing an exceptional situation, in order to restore the status of the main processor under exceptional circumstances during the above operating process; and storing/fetching a data which is required after completing the above processing, by using the register file.

The present invention will be described in more detail subsequently referring to the drawings.

BRIEF DESCRIPTION OF THE DRAWINGS

The above object, and other features and advantages of the present invention will become more apparent by describing the preferred embodiment thereof with reference to the accompanying drawings, in which.

Similar reference characters refer to similar parts throughout the several views of the drawings.

DETAILED DESCRIPTION OF THE INVENTION

Figure 1:
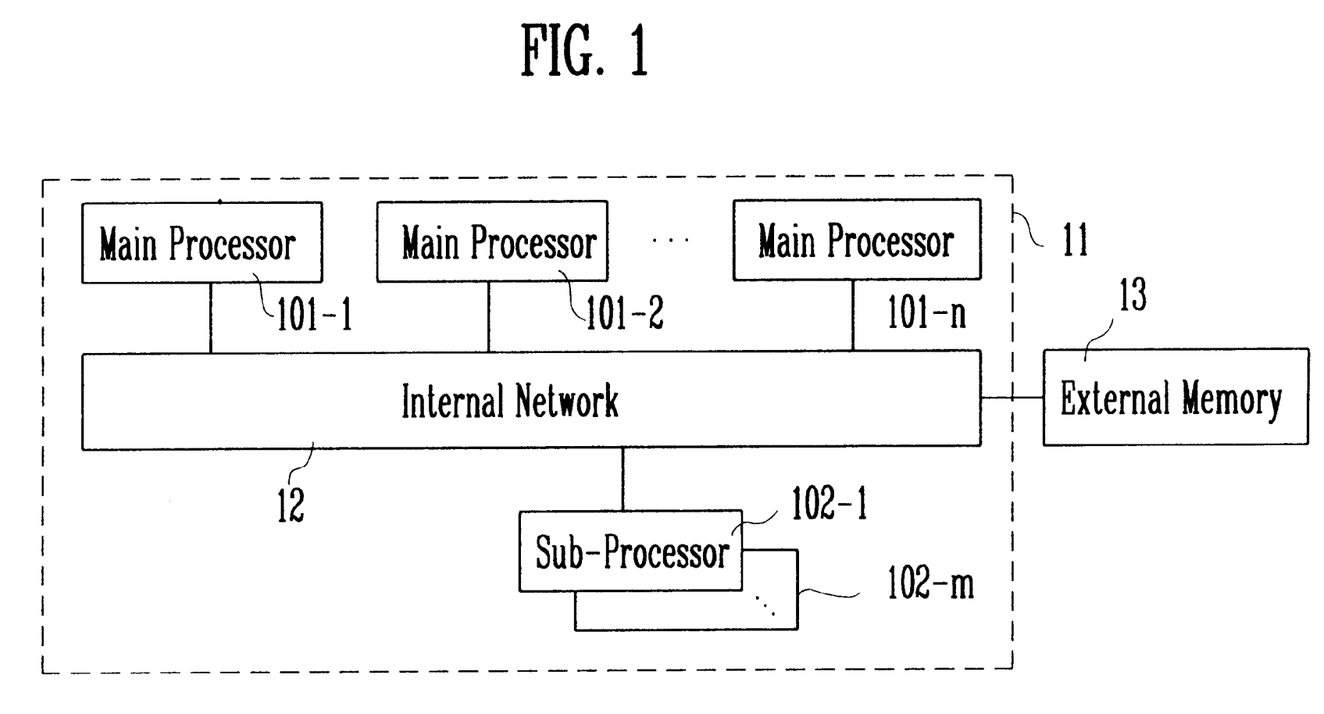
FIG. 1 shows a block diagram for illustrating a concept of sharing the sub processor according to the present invention.

FIG. 1 is a block diagram for illustrating a concept of sharing a sub processors according to the present invention. It shows a structure of a processor 11 in which one or more main processors 101-1 to 101-n share one or more sub processors 102-1 to 101-m. Herein, the number of sub processors may be of one or more and are connected in parallel without any interaction between sub processors 102-1 to 102-m.

The main processors 101-1 to 101-n process a program by receiving an instruction and data from an external memory 13 and transfer a corresponding instruction of the sub processor to predetermined sub processors 102-1 to 102-m via the internal network 12 when they have fetched an instruction for sub processor. In order to have the optimum instruction-level parallelism, the main processors 101-1 to 101-n transfer an instruction without waiting for the time when the sub processors 102-1 to 102-m complete processing of an instruction, and immediately thereafter, process the next instructions. The sub processors 102-1 to 102-m process the instructions with the main processors 101-1 to 101-n in parallel and upon completing the processing, inform the main processors 101-1 to 101-m of its completion. Also, the sub processors 102-1 to 102-m can receive instructions from one or more main processors and therefore, maintain the number of register file necessary for processing equal to the number of main processor.

Figure 2:
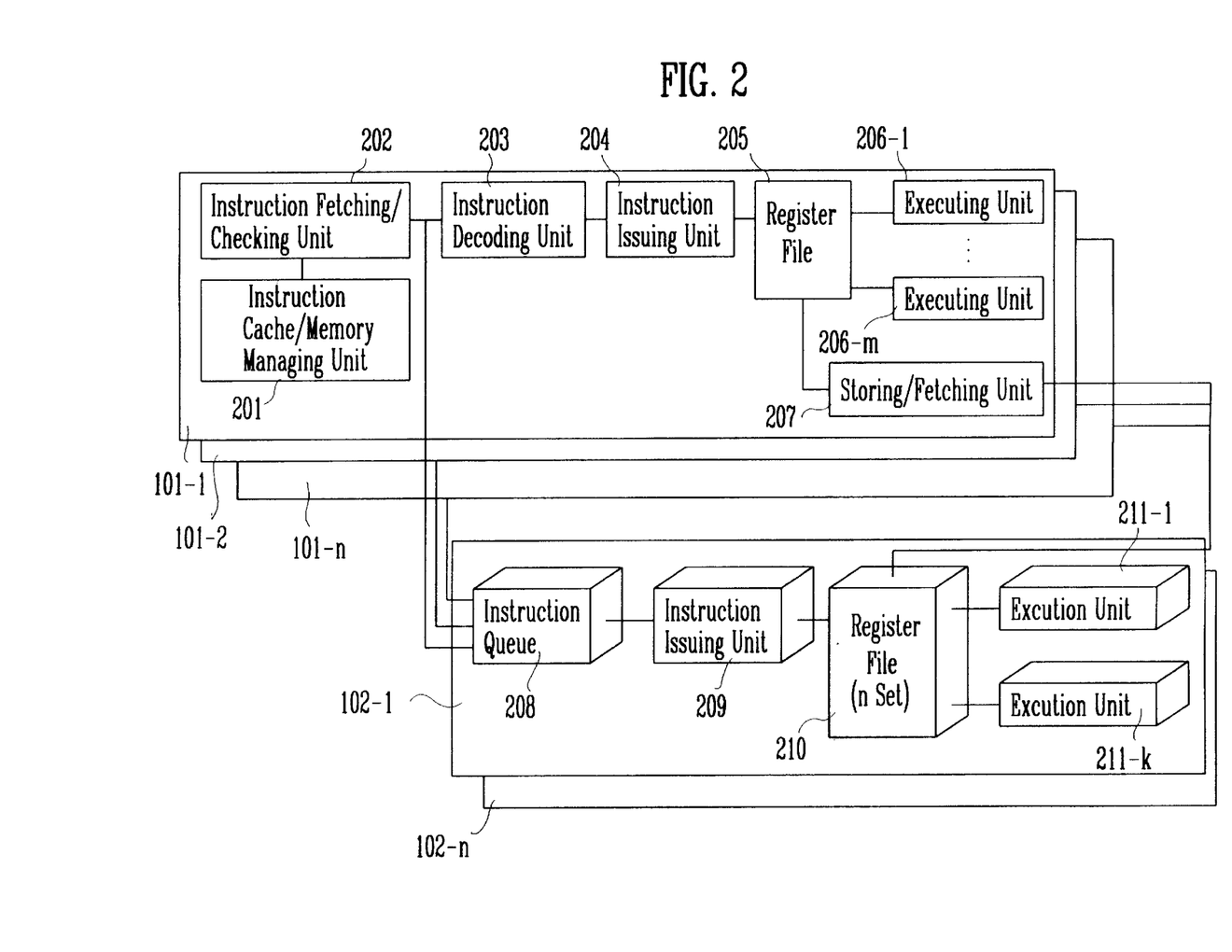
FIG. 2 shows a detailed structure according to the present invention.

FIG. 2 is a structure of the processor according to the present invention. A flow of program is managed by the main processors 101-1 to 101-n and instructions of the program are fetched from an external memory (referred to 13 in FIG. 1) via instruction cache/memory managing unit 201 and an instruction fetching/checking unit 202. The fetched instructions are checked as to whether they are for a sub processor, and if they are for sub processor, they are transferred to an instruction queue 208 in the sub processors 102-1 to 102-m via an internal network (referred to 12 FIG. 1). If the fetched instructions are for a main processor, they are transferred to an instruction decoding unit 203 in the main processors 101-1 to 101-n and the related information including kinds of instructions and the necessary resources are extracted. The instructions, which have been converted in the form of the internal information in the instruction issuing unit 204 in the main processors are allocated to a register and an executing unit so that the maximum instructions can be executed simultaneously by considering the status of the internal resources of the main processors 101-1 to 101-n. After that, the allocated instructions are transferred to the register file 205 and the executing units 206-1 to 206-m. The executing units 206-1 to 206-m perform the four arithmetic operations, logic operations and so on and fetch/store the necessary data by using the register file 205. When instructions are the instructions which require fetching data from the exterior or store data to the exterior, the instruction issuing unit 204 in main processor transfers the data to storing/fetching unit 207 and then storing/fetching unit 207 fetches data from the exterior to the register file 205 or stores data from the register file 205 to the exterior. Herein, when there is an internal data cache, the internal data cache is used through a memory management function. If there is no corresponding data region on the above internal data cache, an external memory is accessed. A plurality of the main processors 101-1 to 101-n process the above operations independently of different processors.

The sub processors 102-1 to 102-m are always capable of monitoring the instruction queue 208 and when the related instructions are inputted from the main processor 101-1 to 101-n, the instruction issuing unit 209 in the sub processors initiate operation. The instruction queue 208 in the sub processors supports one independent queue structure for each main processor and therefore has the numbers of queue structures equal to the number of main processors. The instructions issuing unit 208 in the sub processor checks totally the queue for each main processor and selects the instructions which are capable of being processed simultaneously. Each main processor processes a portion of a program independent of each other and has a register file 205, individually. Therefore, in the sub processors, it is only considered as to whether the execution units 211-1 to 211-k and the register file 210 corresponding to them may be used.

That is, the parallelism may be maintained by only simple control circuit, compared to the main processor or the high performance processors of a super-scalar system. When only one main processor inputted the instructions of the sub processor, that is, the only one queue 208 for the main processor includes valid instructions, the instruction issuing unit 209 in the sub processor checks several portions of the corresponding queue simultaneously, thereby checking an instruction which can be executed in parallelism. In this case, the inter-dependency between instructions to be executed simultaneously should be checked. Instructions selected by the instruction issuing unit 209 are allocated to the executing unit 211-1 to 211-k and the register file 210. The executing units 211-1 to 211-k execute arithmetic operations such as the four arithmetic operations and logic arithmetic operations according to the information which is transferred from the instruction issuing unit 209 and stores/fetches the necessary data by using the corresponding register file of the sub processor. The register file in the sub processor also numbers one per main processor. When the instruction of the sub processor is an instruction which requires fetching data from the exterior the sub processor or store register of the sub processor to the exterior, the instruction issuing unit 204 of the main processor fetches data from the exterior to the register file 210 of the sub processor for the corresponding main processor or stores the data of the register file 210 to the exterior, by controlling the storing/fetching unit 207 of the main processor. That is, the storing/fetching instruction processes directly in the main processor, not in the sub processor when it transfers the data of the sub processor and uses only the register file by accessing directly the register file 210 of the sub processor. Therefore, the sub processor can provide consistent management of the external memory, without duplicating the function of memory management of the main processor. Although the sub processors 102-1 to 102-m are of several kinds, if each sub processor provides the above same function, they can be utilized without considering the inter-dependency thereof.

Figure 3:
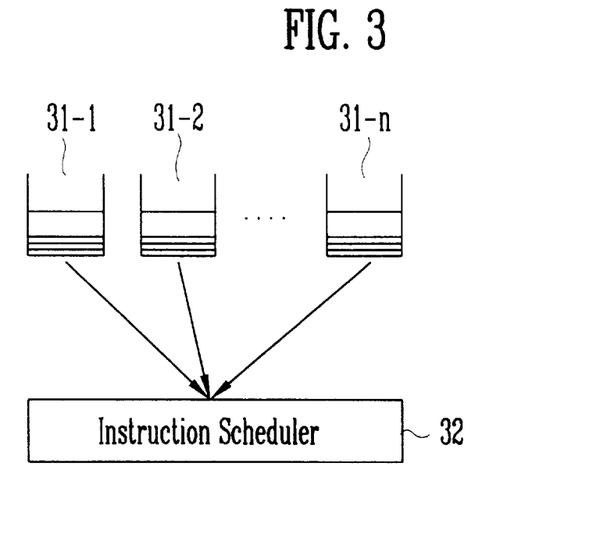
FIG. 3 shows a block diagram for illustrating a concept of instruction scheduling related to a plurality of instruction queues.

FIG. 3 is a block diagram for illustrating a concept of scheduling an instruction for a plurality of instruction queues. It shows a method in which an instruction scheduler 32 in the instruction issuing unit (referred to 209 in FIG. 2) simultaneously processes a plurality of instructions of the sub processors by using the queue structures 31-1 to 31-n. The queue structure is allocated one per main processor so that its number(n) is equal to the number of main processors. The instruction scheduler 32 checks the first ends of n numbers of queue structure and at this time, the instructions of the sub processor which are inputted to the each queue are independent each other. Therefore, as far as the execution unit and the corresponding register permit, several instructions can be issued simultaneously. That is, in case instructions which use the same executing units 211-1 to 211-k in FIG. 2 of the sub processors in two or more queue structure 31-1 to 31-n, are inputted to a same position of end, one of the instructions is issued, and the remaining should be delayed until the executing units 211-1 to 211-k in FIG. 2 are usable. Instructions in different queue structures have no inter-dependency because they use different sets of register files 210 in FIG. 2. However, in a same queue structure, instructions that were issued previously may have inter-dependency. This inter-dependency may happen only for instructions which have not yet completed execution on a cycle, and particularly happen when data storing/fetching instruction is processed. Since all of storing/fetching instructions are processed in the main processor, the instruction issuing unit 204 in FIG. 2 of the main processor should inform the sub processor of a target register file 210 in FIG. 2. when it processes the data storing/fetching instruction for the sub processor, and the instruction scheduler 32 of the sub processor should manage a document structure representing whether usage of register, on the basis of the informed signal.

In case that one (for example, 31-1) of n queue structures only has instruction of the sub processor and the remaining is empty, it is not possible to process simultaneously several instructions by the above method. In this case, the instruction scheduler 32 of the instruction issuing unit (209 in FIG. 2) in the sub processor checks vertically the corresponding queue structure 31-1 and checks several instructions in same queue structure.

Figure 4:
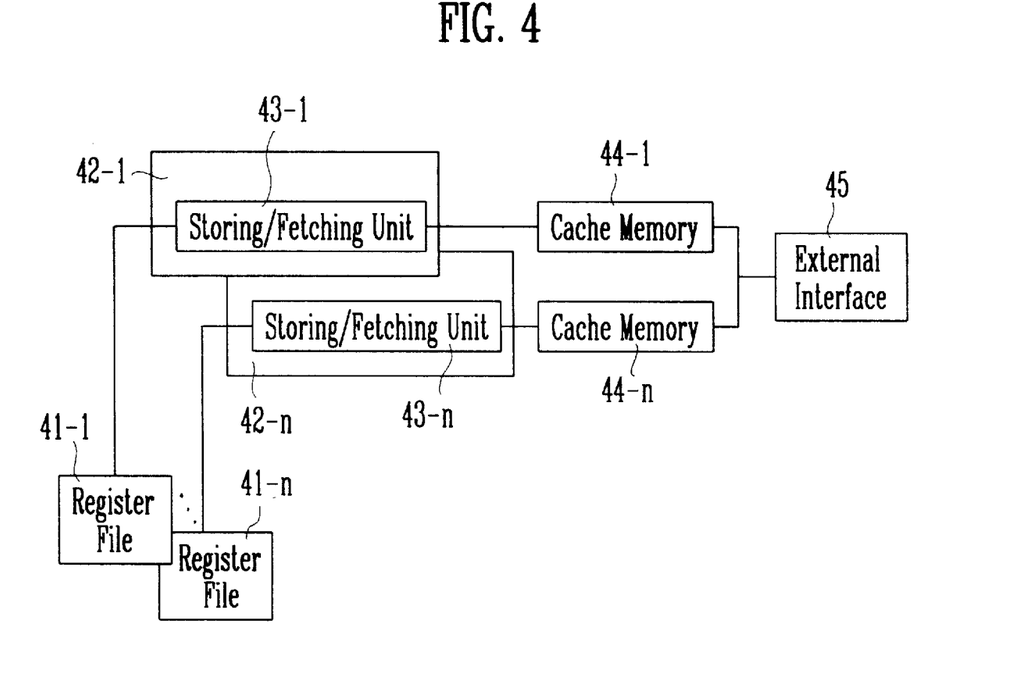
FIG. 4 shows a block diagram for illustrating a method for fetching/storing a data in order to share the sub processors.

FIG. 4 shows a block diagram for illustrating a method for storing/fetching data in order to share the sub processor wherein register file (210 in FIG. 2) is represented being separated by each set of main processors 41-4 to 41-n. Storing/fetching units 43-1 to 43-n are the same as storing/fetching units (207 in FIG. 2) in the main processor and exist equal to number of the main processors. Each of the main processor has cache memories 44-1 to 44-n independently and share external interfaces 45.

As shown, the structure sharing the sub processors according to the present invention has register files 41-1 to 41-n and cache memories 44-1 to 44-n, independently for each of the main processors 42-1 to 42-n and also have an individual data route. When executing data storing/fetching instruction for the sub processor, the corresponding main processor (for example, 42-1) accesses register file 41-1 through the storing/fetching unit 43-1. When storing data to exterior, the storing/fetching unit 43-1 reads the designated register in the corresponding register file 41-1 and stores it in cache memory 44-1. When data for the sub processor in the form of vector or array is larger than usual data, it can designate a type of data of a cache memory not to be used. In this case, the storing/fetching unit 43-1 produces a signal by which cache memory is bypassed. Data bypassing the cache memory according to the above signal is directly stored in the external memory through the external interface.

When data is fetched to register file 41-1 in the sub processor, the storing/fetching unit 43-1 decides whether to bypass the cache memory 44-1 according to a type of data, as in the case of storing data and then controls the bypassing of it. If it decides on bypassing, data is directly transmitted to register file 41-1 through the external interface 45. Like the above, the bypassing function lightens a burden, which cache memories 44-1 to 44-n having a small capacity stand in replacing many blocks in order to move a large volume of data. In addition, since the replaced blocks have a high possibility to be used again at once in a program, it should be necessary to output a vector or array form of data for a sub processor, in order to fetch the replaced block to the cache memory back. Repetition of such replacement has a bad effect on the processor's performance. Therefore, the above described sub processor data bypassing function is very effective. Also, because instructions of the sub processor and instructions of the main processor are executed simultaneously in parallel, profits in performance are large. But, if an exceptional situation happens while executing the sub processor instructions, it must be capable of rolling back to a state prior to the executing of instructions. In this case, because instructions of the main processors after the corresponding instructions of the sub processor have been already executed or are being executed, state of the main processors must be capable of rolling back. The exceptional situation happens while executing the corresponding instructions of the sub processor and therefore, it is positioned before a change of state due to the completion of executing. Therefore, the sub processor can roll-back by simply nullifying the current execution and returning to the initial state.

Since such processors are operated in such a manner that each of the sub processor and the main processor is capable of exhibiting their maximum performance, without being synchronized in instruction unit and the flow of programs is controlled in the main processor, it is important to roll back the state of main processor upon occurring of the exceptional situation. According to the invention, each main processor includes therein a shadow register file, which can copy a register file 205 in FIG. 2 of the main processor and other necessary registers and uses them upon rolling back its state.

Figure 5:
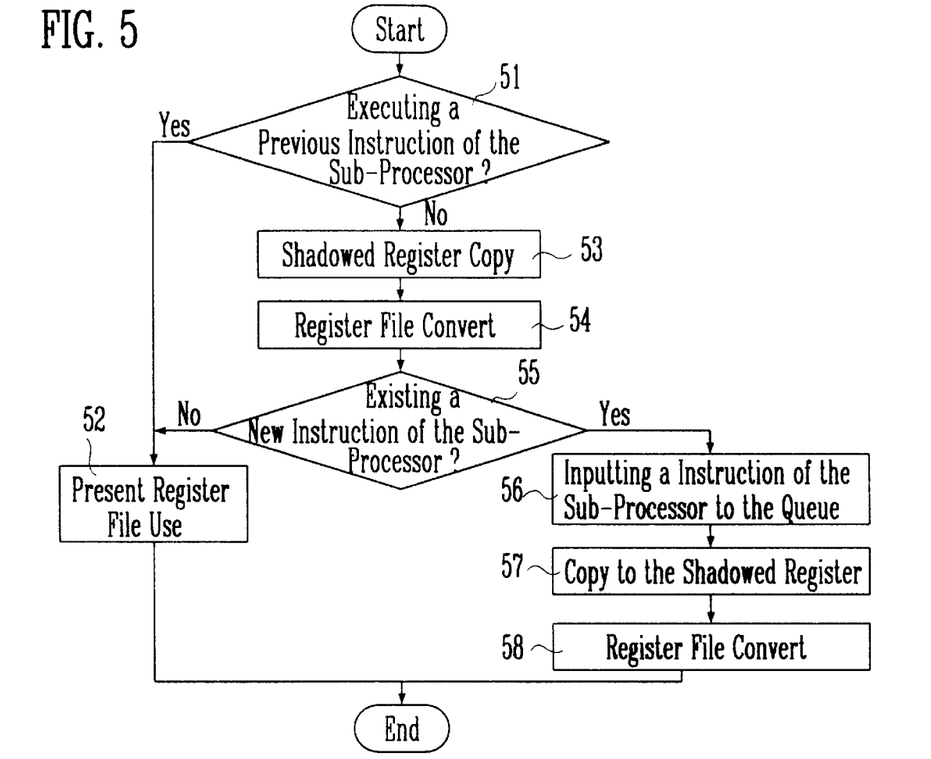
FIG. 5 shows a flow chart for illustrating the method for using a shadow register.

FIG. 5 shows a flow chart for illustrating a process of using a shadow register. To use the shadow register, first, it is determined whether a previous instruction of the sub processor is being executed (step 51). If the previous instruction is being executed, it is recognized that there is a register file, which is shadowed so as to be come back prior to instruction of the sub processor, and therefore, the register file which is used presently is continuously used and forwarded without any additional process (step 52). If the previous instruction of the sub processor have been completed, there is no longer chance to meet the exceptional situation by the just completed instruction, and therefore, the previous shadowed register file 205 in FIG. 2 is copied by new value of the used register (step 53) and the register file being used is converted to come back the original state (step 54). After that, it is determined whether new instruction of the sub processor exists (step 55). If the new instruction does not exist, the register file, which is used presently, is continuously used and forwarded without any additional process (step 52). If the new instruction exists, the instruction of the sub processor is inputted into the instruction queue of the corresponding sub processor (step 53). In order to handle the possible exceptional situation, it is controlled so that register file 205 in FIG. 2 of the main processor is copied by the shadowed register file (step 57). In this case, registers such as program counter, stack pointer, and so on, which are necessary for executing programs together with the register file are copied also. After that, the main processor converts the copied shadow register file to a main register file (step 58) and the original register file maintains a state before the corresponding instruction of the sub processor is inputted to instruction queue and therefore, the using process of the shadow is ended. Fetching/checking unit of the main processor 202 in FIG. 2, instruction decoding unit 203 in FIG. 2 and issuing unit 204 in FIG. 2 of main processor repeats the above process, through mutual cooperation, each cycle in which new instruction is issued. Through the above process, to be prepared for an occurrence of the exceptional situation in the sub processor, it can use either register file by converting the register file and the essential registers according to the program, upon issuing instruction of the sub processor.

Figure 6:
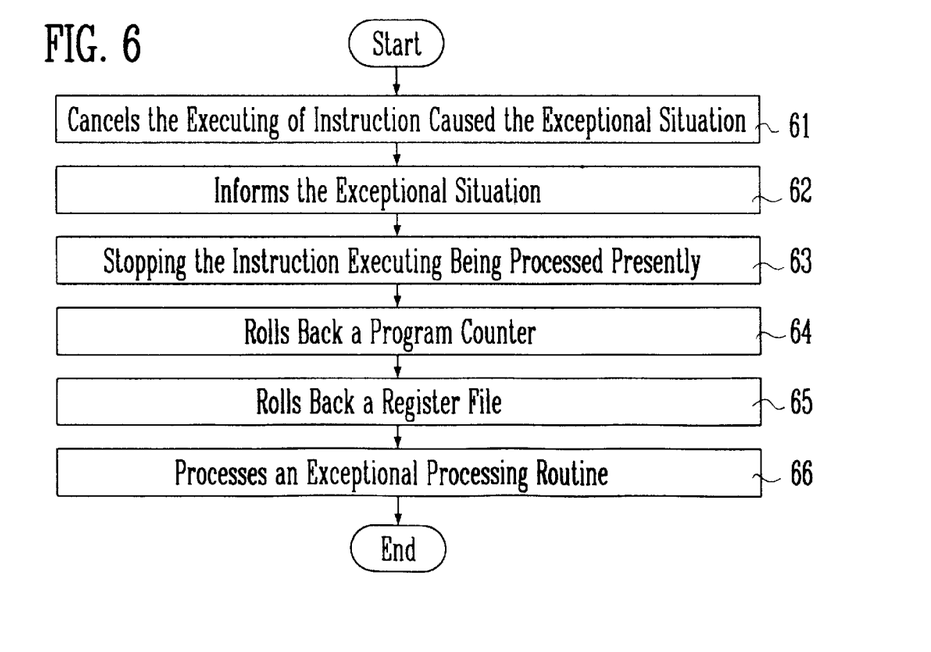
FIG. 6 shows a flow chart for illustrating a process of processing an exceptional situation a in sub processor.

FIG. 6 shows a flow chart for illustrating a process of processing an exceptional situation in sub processor. If the exceptional situation happens when executing the instruction in the sub processor, the sub processor cancels the executing of an instruction that causes an exceptional situation (step 61) and informs the main processor, which had issued the instruction, of the exceptional situation. If the main processor is informed of the occurrence of the exceptional situation upon executing the instruction from the sub processor, the executing being processed presently is interrupted (step 63). In this case, other main processors, which do not issue the corresponded, continuously execute their operations, regardless of the above interruption. The main processor, which was informed the exceptional situation, rolls back a program counter to a state immediately before issuing of the sub program (step 64). Register file also converts the file, which were shadowed upon issuing instruction of the sub processor (step 65). After that, the main processor processes and ends an exceptional processing routine according to an exceptional processing mode (step 66).

As described above, the present invention teaches a method in which a plurality of main processors is capable of sharing effectively the sub processor by using instruction queue for the sub processor, with building-in the sub processor therein. Such sharing method may have an efficiency through providing solutions for functions that are capable of processing an exceptional situation in the sub processor or fetching/storing data for the sub processor, and scheduling in order to maintain instruction-level parallelism in the sub processor. In order to process these functions and meet the exceptional situation in the sub processor, the present invention teaches a method for being capable of converting and thereby using mutually register files and registers according to the program flow under issuing of the sub processor instruction.

Also, by preparing a route which can bypass a small cache memory when large quantity of data are massively used. An access efficiency of large quantity of data for the sub processor can be improved without deteriorating an overall processor performance. Further, there is presented a method for providing an inter-queue scheduling and an intra-queue scheduling, simultaneously, so as to improve its performance, by executing in parallel the internal executing units of the sub processor under the situation that several processors are sharing. By these methods, various sub processors can be shared easily, in processors having a plurality of main processors.

As explained above, according to the present invention, the improving of processor's structure and flexibility for changing of its constitution can be increased greatly by improving a processor's performance having sub processor through maximization of an executing efficiency of sub processor and main processor under environment in which a plurality of main processors exist and by letting sub processor and main processor be independently converted, improved and added. Further, by lightening the burden that all processors have sub processor independently, it can provide effectively various functions of sub processor within a limited semiconductor resources.

While the present invention has been described and illustrated herein with reference to the preferred embodiment thereof, it will be understood by those skilled in the art that various changes in form and details may be made therein without departing from the spirit and scope of the invention.

What is claimed is:

1. A structure of processor having a plurality of main processors and sub processors comprising:
    a plurality of main processors which process programs by receiving instructions and data from an external memory, each of said main processors comprises:
        an instruction cache/memory management unit which stores instructions which are inputted from said external memory,
        an instruction fetching/checking unit which fetches instructions from said instruction cache/memory management unit and checks whether said instructions are for a main processor or a sub processor,
        an instruction decoding unit which converts said instruction to a form of internal informality,
        a main processor instruction issue unit which allocates registers and execution units so that said instructions converted into a form of internal information are executed,
        a register file which stores data necessary for execution of said instructions,
        a plurality of execution units which execute operations according to information received from said main processor instruction issue unit, and
        a storing/fetching unit which stores or fetches external data;
    a plurality of sub processors which process said instructions received from said main processors in parallel with said main processors, each of said processor comprises:
    an instruction queue which stores temporarily instructions fetched from said main processor for a sub processor,
    a sub processor issuing unit which selects instructions that can be processed simultaneously by checking said instruction queue,
    a plurality of register files which stores data necessary for said instructions,
    a plurality of said register files which is equal in number to the number of said main processors, and
    a plurality of sub processor execution units which execute operations according to information of said instructions; and
    an internal connecting network which connects said main processors and said sub processors.

2. A structure of processor having a plurality of main processors and sub processors according to claim 1, wherein said main processors further comprising:
    a shadow register file which maintains a copy of register file before execution of said instruction which is for the sub processor, for recovering from exceptions of sub processors.

3. A structure of processor having a plurality of main processors and sub processors according to claim 1, wherein said instruction queue supports an independent queue structure per each main processor by having as many queue structures as the number of main processor.

4. A method for sharing sub processors in a processor having a plurality of main processors and sub processors comprising the steps of:
    fetching instructions from an external memory via an instruction cache/memory management unit and an instruction fetching/checking unit;
    checking whether said fetched instructions are for a main processor or a sub processor;
    transferring said instructions to an instruction decoding unit of said main processor if said fetched instructions are for main processor;
    transferring said fetched instructions to an instruction queue of said sub processor when said fetched instruction are for the sub processor;
    copying contents of register file and status registers including program counter, stack pointer and other status registers into shadow register file for roll-back on a future exception of the sub processor;

checking all instruction queues and selecting instructions which can be processed simultaneously;

allocating execution units and register files of said sub processor executing said instruction;

reporting the results of said instructions that are fed by said main processor; and checking exceptions from said sub processor;

roll backing the contents of register file and status registers with shadow register file when exception is generated by said sub processor.

5. A method for sharing sub processors in a processor having a plurality of main processors and sub processors according to claim 4, wherein a process of using said shadow register comprising the steps of:

determining whether a previous instruction of sub processor is being executed;

continuing use of the presently used register file if said previous instruction is being executed without occurring exception;

copying said previous shadowed register file by a new value of the used register if the previous instruction of the sub processor have been completed;

resuming the initial state by converting said register file used presented to said main register file;

determining whether a new instruction of the sub processor exists;

continuing use of said presently used register file if said new instruction of sub processor does not exist;

inputting said previous instruction of the sub processor to the instruction queue of the corresponding sub processor if said new instruction for sub processor does exist;

copying said main register file used presently to the shadow register to handle a possible exceptional situation;

copying a register, including a program counter and stack pointer to the shadow register;

converting said copied shadow register file to the present register file for the corresponding main processor; and maintaining a state in said original main register file before issuing the corresponded instruction of the sub processor as the state for restoring when occurring exceptional case.

6. A method for sharing sub processors in a processor having a plurality of main processors and sub processors according to claim 5, wherein a process of processing said exceptional situation comprises the steps of:

canceling execution of an instruction that caused the exceptional situation;

informing the main processor, which had issued the instruction, of the exceptional situation;

interrupting an executing being processed presently if the main processor is informed the occurrence of the exceptional situation;

rolling back a program counter and register file to a state immediately before issuing the sub processor instruction which caused the exceptional situation by restoring the original main register file saved before issuing the corresponded sub processor instruction by the main processor which was informed the exceptional situation; and processing and ending an exceptional processing routine according to an exceptional processing mode.

7. A method for sharing sub processors in a processor having a plurality of main processors and sub processors according to claim 4, wherein said method for fetching/storing data is designed to bypass a cache memory according to a type of data.

* * * * *